United States Patent
Wang et al.

(10) Patent No.: US 8,370,363 B2
(45) Date of Patent: Feb. 5, 2013

(54) HYBRID NEIGHBORHOOD GRAPH SEARCH FOR SCALABLE VISUAL INDEXING

(75) Inventors: Jingdong Wang, Beijing (CN); Xian-Sheng Hua, Bellevue, WA (US); Shipeng Li, Palo Alto, CA (US); Jing Wang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/091,323

(22) Filed: Apr. 21, 2011

(65) Prior Publication Data

US 2012/0271833 A1 Oct. 25, 2012

(51) Int. Cl.
*G06F 17/30* (2006.01)

(52) U.S. Cl. .................... 707/743; 707/797; 707/798

(58) Field of Classification Search .................. 707/743, 707/913, 999.002, 797, 798, 999.003
See application file for complete search history.

(56) References Cited

U.S. PATENT DOCUMENTS

| | | | |
|---|---|---|---|
| 5,544,284 A | 8/1996 | Allebach et al. | |
| 6,122,628 A | 9/2000 | Castelli et al. | |
| 6,138,113 A * | 10/2000 | Dean et al. | 715/208 |
| 6,154,746 A | 11/2000 | Berchtold et al. | |
| 6,321,220 B1 * | 11/2001 | Dean et al. | 707/726 |
| 6,549,896 B1 * | 4/2003 | Candan et al. | 1/1 |
| 7,117,206 B1 * | 10/2006 | Bharat et al. | 1/1 |
| 7,191,164 B2 | 3/2007 | Ray et al. | |
| 7,630,973 B2 * | 12/2009 | Black et al. | 1/1 |
| 7,698,294 B2 * | 4/2010 | Ma et al. | 707/741 |
| 7,983,341 B2 * | 7/2011 | Wang | 375/240.16 |
| 2005/0114331 A1 * | 5/2005 | Wang et al. | 707/6 |
| 2005/0165757 A1 * | 7/2005 | Broder | 707/3 |
| 2006/0271526 A1 * | 11/2006 | Charnock et al. | 707/3 |
| 2007/0022329 A1 | 1/2007 | Adamek et al. | |
| 2007/0064627 A1 * | 3/2007 | Campos | 370/255 |
| 2007/0274687 A1 | 11/2007 | Varekamp et al. | |
| 2008/0027917 A1 | 1/2008 | Mukherjee et al. | |
| 2008/0154862 A1 * | 6/2008 | Henriot | 707/3 |
| 2008/0183682 A1 * | 7/2008 | Lang et al. | 707/3 |
| 2008/0183695 A1 * | 7/2008 | Jadhav | 707/5 |
| 2008/0316988 A1 * | 12/2008 | Lee et al. | 370/338 |
| 2009/0024586 A1 * | 1/2009 | Zhou | 707/3 |
| 2009/0210413 A1 * | 8/2009 | Hayashi et al. | 707/5 |
| 2009/0234829 A1 * | 9/2009 | Gollapudi et al. | 707/5 |
| 2010/0114871 A1 * | 5/2010 | Cheong et al. | 707/719 |
| 2010/0177955 A1 * | 7/2010 | Simakov et al. | 382/154 |

(Continued)

OTHER PUBLICATIONS

Zighed et al., "Proximity Graphs for Image Retrieval", pp. 795-802 of "COMPSTAT 2006—Proceedings in Computational Statistics", A Springer Company, Aug.-Sep. 2006, pp. 795-802 (Provided by Applicant).*

(Continued)

*Primary Examiner* — Phuong Thao Cao
(74) *Attorney, Agent, or Firm* — Lee & Hayes, PLLC

(57) ABSTRACT

A hybrid search method may be used to identify information responsive to a query. A search may be performed utilizing a neighborhood graph and a partitioning tree. The partitioning tree may be searched to select one or more pivots that may be used to guide a subsequent search in the neighborhood graph. Once the search in the neighborhood graph is unable to identify nearest neighbors in closer proximity to the query, the search may be switched to the partitioning tree. The partitioning tree may then be searched to select pivots that may be used to guide subsequent searches in the neighborhood graph. The searches performed in the partitioning tree and/or the neighborhood graph may be conducted utilizing an iterative algorithm.

20 Claims, 5 Drawing Sheets

U.S. PATENT DOCUMENTS

| | | | |
|---|---|---|---|
| 2011/0060750 A1* | 3/2011 | Kuhn et al. | 707/758 |
| 2011/0151898 A1* | 6/2011 | Chandra et al. | 455/466 |
| 2011/0208429 A1* | 8/2011 | Zheng et al. | 701/209 |

OTHER PUBLICATIONS

Hacid et al., "Content-Based Retrieval in Large Image Databases", IEEE, 2006, pp. 498-501 (4 pages).*

Hacid et al., "Neighborhood Graphs for Indexing and Retrieving Multi-dimensional data", Journal of Intelligent Information Systems, vol. 34, No. 1 (2001), pp. 93-111 (19 pages).*

Chavez et al., "Navigating K-Nearest Neighbor Graphs to Solve Nearest Neighbor Searches", In Advances in Pattern Recognition—Proceedings Second Mexican Conference on Pattern Recognition, MCPR 2010, 10 pages.*

Scuturici et al., "Topological Representation Model for Image Database Query", Journal of Experimental & Theoretical Artificial Intelligence, vol. 17, No. 1-2, Jan.-Jun. 2005, pp. 145-160.*

Mico et al., "A new version of the Nearest-Neighbour Approximating and Eliminating Search Algorithm (AESA) with Linear Preprocessing Time and Memory requirements", Pattern Recognition Letters 15, 1994, pp. 9-17.*

Hajebi et al., "Fast Approximate Nearest-Neighbor Search with k-Nearest Neighbor Graph", Proceedings of the Twenty-Second International Join Conference on Artificial Intelligence, 2011, pp. 1312-1317.*

Wang et al., "Query-Driven Iterated Neighborhood Graph Search for Scalable Visual Indexing", Aug. 10, 2012, 11 pages, accessed online at <http://research.microsoft.com/pubs/172920/TechReport.pdf> on Oct. 12, 2012.*

Kurasawa et al., "Optimal Pivot Selection Method Based on Partition and the Pruning Effect for Metric Space Indexes", IEICE Trans. Inf. & Syst., vol. E94-D, No. 3, Mar. 2011, pp. 504-514 (11 pages).*

Xu et al., "Nearest Neighbor Search in General Metric Spaces Using a Tree Data Structure with a Simple Heuristic", J. Chem. Inf. Comput. Sci. 2003 (43), 2003 , pp. 1933-1941 (9 pages).*

Skopal, "Pivoting M-Tree: A Metric Access Method for Efficient Similarity Search", In Proceedings of the Annual International Workshop on DAtabase TExts, Specifications and Objects (DATESO), Apr. 2004, pp. 27-37 (11 pages).*

Bustos et al., "Pivot Selection Techniques for Proximity Searching in Metric Spaces", In Proceedings of the 11th Conference of the Chielan Computer Science Society (SCCC01), IEEE CS Press, Preprint submitted to Elsevier Science on Mar. 18, 2003, 13 pages.*

Ozaki et al., "Using the Mutual k-Nearest Neighbor Graphs for Semi-Supervised Classification of Natual Language Data", In. Proceedings of the Fifteenth Conference on Computational Natural Language Learning, Jun. 2011, pp. 154-162 (9 pages).*

Serrano et al., "Impact of the Initialization in Tree-Based Fast Similarity Search Techniques", SIMBAD 2011, LNCS 7005, 2001, pp. 163-176 (14 pages).*

Skopal et al., "Improving the Performance of M-Tree Family by Nearest-Neighbor Graphs", In Proceedings of the 11th East European Conference on Advances in Database and Information Systems (ADBIS'07), Sep. 2007, 16 pages.*

Paredes et al., "Using the k-Nearest Neighbor Graph for Proximity Searching in Metric Spaces", In Proceedings of the 12th String Processing and Information Retrieval, 2005, pp. 127-138 (12 pages).*

Cayton et al., "A Learning Framework for Nearest Neighbor Search", In Advances in Neural Information Processing Systems, 2007, 10 pages.*

Chavez et al., "Navigating K-Nearest Neighbor Graphs to Solve Nearest Neighbor Searches", Lecture Notes in Computer Science, 2010, vol. 6256, Advances in Pattern Recognition, pp. 270-280 (11 pages).*

Weiss, et al., "Spectral Hashing", Advances in the Neural Information Processing Systems 21: Proceedings of the 2008 Conference (NIPS), Dec. 2008, 8 pages.

Yamaguchi, et al., "Octree-Related Data Structures and Algorithms", IEEE Computer Graphics Applications, vol. 4, No. 1, Jan. 1984, pp. 53-59.

Yianilos, "Data Structures and Algorithms for Nearest Neighbor Search in General Metric Spaces" Proceedings of the fourth annual ACM-SIAM Symposium on Discrete Algorighns (SODA '93), Jan. 1993, 11 pages.

Zighed, et al., "Proximity graphs for image retrieval", pp. 795-802 of "'COMPSTAT 2006—Proceedings in Computational Statistics", A Springer Company, Aug.-Sep. 2006, pp. 795-802.

Aksoy, et al., "Graph-Theoretic Clustering of Image Grouping and Retrieval", IEEE Computer Society Conference on Computer Vision and Pattern Recognition, Jun. 1999, 6 pages.

Arya, et al., "Algorithms for Fast Vector Quantization", IEEE Proceedings of Data Compression Conference (DCC), Mar. 30-Apr. 1, 1993, 17 pages.

Arya, et al., "An Optimal Algorithm for Approximate nearest Neighbor Searching Fixed Dimensions", Journal of the ACM, vol. 45, No. 6, Nov. 1998, pp. 891-923.

Arya, et al., "Approximate Nearest Neighbor Queries in Fixed Dimensions", Proceedings of the fourth annual ACM-SIAM Symposium on Discrete algorithms (SODA), Jan. 1993, 10 pages.

Athitsos, et al., "Learning Embeddings for Fast Approximate Nearest Neighbor Retrieval", Shankhnarovich (ed.), Nearest-Neighbor Methods in Learning and Vision Theory and Practice, The MIT Press, Cambridge Massachusettes, Mar. 2006, 26 pages.

Beis, et al., "Shape Indexing using Approximate Nearest-Neighbour Search in High-Dimensional Spaces", 1997 IEEE Computer Society Conference on Computer Vision and Pattern Recognition (CVPR '97), Jun. 1997, 7 pages.

Bentley, "Multidimensional Binary Search Trees used for Associative Searching", Communications of the ACM, vol. 18, No. 9, Sep. 1975, pp. 509-517.

Bishnu, et al., "Euler Vector for Search and Retrieval of Gray-Tone Images", IEEE Transactions on Systems, Man, and Cybernetics—Part B: Cybernetics, vol. 35, No. 4, Aug. 2005, pp. 801-812.

Bohm, et al., "Searching in High-Dimensional Spaces—Index Structures for Improving the Performance of Multimedia Databases", ACM Computing Surveys, vol. 33, No. 3, Sep. 2001, pp. 322-373.

Breiman, "Random Forests", Journal of Machine Learning, vol. 45, No. 1, Oct. 2001, 33 pages.

Brown, et al., "Recognising Panoramas", IEEE Computer Society, Proceedings of the Ninth International Conference on Computer Vision (ICCV), Oct. 2003, 8 pages.

Chen, et al., "Fast Image Database Search using Tree-Structured VQ", retrieved on Jun. 30, 2010 at <<http://ieeexplore.ieee.org/stamp/stamp.jsp?tp=&arnumber=638624 >>, IEEE Proceedings of International Conference on Image Processing, vol. 2, Oct. 1997, pp. 827-830.

Dasigi, et al., "Efficient Graph-based Image Matching for Reconition and Retrieval", Proceedings of National Conference on Computer Vision, Pattern recognition, Image Processing and Graphics (NCVPRIPG-2008), Jan. 2008, 9 pages.

Datar, et al., "Locality Sensitive Hashing Scheme Based on p-stable Distributions", Proceedings of the twentieth annual symposium on Computational geometry (SCG), Jun. 2004, pp. 253-262.

Faloutsos, et al., "A Fast Algorithm for Indexing, Data-Mining and Visualization of Traditional and Multimedia Datasets", Proceedings of the 1995 ACM SIGMOD international conference on Management of data, vol. 24, Issue 2, May 1995, pp. 163-174.

Finkel, et al., "Quad trees: A data structure for retrieval on composite keys", Acta Informatica, vol. 4, Apr. 1974, pp. 1-9.

Friedman, et al., "An Algorithm for Finding Best Matches in Logarithmic Expected Time", Journal ACM Transactions on Mathematical Software (TOMS), vol. 3, Issue 3, Sep. 1977, 38 pages.

He, et al., "An Investigation of Using K-d Tree to Improve Image Retrieval Efficiency", Digital Image Computing Techniques and Application (DICTA2002), Jan. 2002, 6 pages.

He, et al., "Scalable Similarity Search with Optimized Kernel Hashing", Proceedings of the 16th ACM SIGKDD international conference on Knowledge discovery and data mining, Jul. 2010, 10 pages.

Jain, et al., "Fast Image Search for Learned Metrics", IEEE Conference on Computer Vision and Pattern Recognition, Jun. 2008, 8 pages.

Jia, et al., "Optimizing kd-Trees for Scalable Visual Descriptor Indexing", 2010 IEEE Conference on Computer Vision and Pattern Recognition (CVPR), Jun. 2010, pp. 3392-3399.

Kulis, et al., "Kernelized Locality-Sensitive Hashing for Scalable Image Search", Proceedings of the IEEE International Conference on Computer Vision (ICCV), Oct. 2009, 8 pages.

Kulis, et al., "Learning to hash with binary reconstructive embeddings", Technical Report No. UCB/EECS-2009-101, Jul. 2009, 11 pages.

Kumar, et al., "What Is a Good Nearest Neighbors Algorithm for Finding Similar Patches in Images?", Springer-Verlag Berlin, Lecture Notes in Computer Science vol. 5303, Proceedings of the 10th European Conference on Computer Vision: Part II (ECCV), Oct. 2008, pp. 364-378.

Liu, et al., "An Investigation of Practical Approximate Nearest Neighbor Algorithms", Proceedings of the Neural Information Processing Systems (NIPS 2004), Dec. 2004, 8 pages.

Lowe, "Distinctive Image Features from Scale-Invariant Keypoints", International Journal of Computer Vision, vol. 60, No. 2, Jan. 2004, 28 pages.

Luque, et al., "Broad-Phase Collision Detection Using Semi-Adjusting BSP-trees", Proceedings of 2005 Symposium on Interactive 3D Graphics and Games, Apr. 2005, 8 pages.

MacDonald, et al., "Heuristics for ray tracing using space subdivision", The Visual Computer, International Journal of Computer Graphics, vol. 6, Issue 3, 1990, pp. 153-166.

McNames, "A Fast Nearest Neighbor Algorithm Based on a Principal Axis Search Tree", IEEE Transactions on Pattern Analysis and Machine Intelligence (PAMI), vol. 23, No. 9, Sep. 2001, pp. 964-976.

Mikolajczyk, et al., "Improving Descriptors for Fast Tree Matching by Optimal Linear Projection", IEEE 11th International Conference on Computer Vision (ICCV), Oct. 2007, 8 pages.

Moore, "The anchors hierarchy Using the triangle inequality to survive high dimensional data", Proceedings of the 16th Conference in Uncertainty in Artificial Intelligence (UAI '00), Jun./Jul. 2000, 9 pages.

Muja, et al., "Fast approximate nearest neighbors with automatic algorithm configuration", Proceedings of the VISAPP—International Conference on Computer Vision Theory and Applications, Feb. 2009, 10 pages.

Navarro, "Searching in Metric Spaces by Spatial Approximation", IEEE Computer Society String Processing and Information Retrieval Symposium & International Workshop on Groupware, SPIRE/CRIWG 1999, Sep. 1999, 8 pages.

"Nearest Neighbor Search", retrieved on Dec. 15, 2010 at <<http://www8.cs.umu.se/kurser/TDBAfl/VT06/algorithms/BOOK/BOOK4/NODE188.HTM >>, 3 pages.

Nister, et al., "Scalable Recognition with a Vocabulary Tree", Proceedings of the 2006 IEEE Computer Society Conference on Computer Vision and Pattern Recognition (CVPR '06), Jun. 2006, 8 pages.

Philbin, et al., "Object retrieval with large vocabularies and fast spatial matching", IEEE Proceedings of the Conference on Computer Vision and Pattern Recognition (CVPR '07), Jun. 2007, 8 pages.

Qian, et al., "A Space-Partitioning-Based Indexing Method for Multidimensional Non-Ordered Discrete Data Spaces", ACM Transactions on Information Systems, vol. 24, No. 1, Jan. 2006, pp. 79-110.

Raginsky, et al., "Locality-Sensitive Binary Codes from Shift-Invariant Kernels", 23rd Annual Conference on Neural Information Processing Systems (NIPS), Dec. 2009, 9 pages.

Samet, "Foundations of Multidimensional and Metric Data Structure", Computer Science Department, University of Maryland, Sep. 2002, 32 pages.

Samet, "Similarity Searching: Indexing, Nearest Neighbor Finding, Dimensionality Reduction, and Embedding Methods for Applictions in Multimedia Databases", Abstract, 19th International Conference on Pattern Recognition (ICPR 2008), Dec. 2008, 1 page.

Sebasian, et al., "Metric-Based Shape Retrieval in Large Databases", 16th International Conference on Pattern Recognition (ICPR'02)—Aug. 2002, vol. 3, 6 pages.

Shalizi, "Classification and Regression Trees", retrieved on Jun. 29, 2010 at <<http://wwwstat.cmu.edu/~cshalizi/350/lectures/22/lecture-22.pdf >>, Carnegie Mellon University, Statistics Course 36-350, Data Mining, Nov. 2009, 25 pages.

Silpa-Anan, et al., "Optimised KD-trees for fast image descriptor matching", 2008 IEEE Conference on Computer Vision and Pattern Recognition (CVR 2008), Jun. 2008, 8 pages.

Sivic, et al., "Efficient Visual Search of Videos Cast as Text Retrieval", IEEE Transactions on Pattern Analysis and Machine Intelligence, vol. 31, No. 4, Apr. 2009, pp. 591-606.

Snavely, et al., "Photo tourism exploring photo collections in 3D", ACM Transactions on Graphics (TOG)—Proceedings of ACM SIGGRAPH 2006, vol. 25, Issue 3, Jul. 2006, 12 pages.

Torralba, et al., "80 million tiny images A large data set for nonparametric object and scene recognition", IEEE Transactions on Pattern Analysis and Machine Intelligence, vol. 80, Issue 11, Nov. 2008, 14 pages.

Toth, "Binary Space Partitions: Recent Developments", MSRI Publications, Combinatorial and Computational Geometry, vol. 52, 2005, pp. 529-556.

Toussaint, "The Relative Neighbourhood Graph of a Finite Planar Set", Published in Pattern Recognition, vol. 12, Issue 4, 1980, 14 pages.

Vajda, et al., "Graph-Based Approach for 3D Object Duplicate Detection", 10th Workshop on Image Analysis for Multimedia Interactive Services 2009 (WIAMIS '09), May 2009, 4 pages.

Wang, et al., "Semi-Supervised Hashing for Scalable Image Retrieval", 2010 IEEE Conference on Computer Vision and Pattern Recognition (CVPR), Jun. 2010, 8 pages.

* cited by examiner

HYBRID NEIGHBORHOOD GRAPH SEARCH FOR SCALABLE VISUAL INDEXING

BACKGROUND

Large scale visual search has recently been attracting additional interest with respect to computer vision and/or multimedia search. Moreover, various search schemes, such as utilizing partitioning trees and hashing, have been used to search for images and other information that are stored on a computer device or are otherwise accessible via a network. Although the foregoing search methods may ultimately identify information responsive to a particular query, utilizing partitioning trees and/or hashing to locate this information is frequently time-consuming and inefficient. For instance, in response to a query that requests one or more images associated with a particular topic, existing search methods may identify an image responsive to the query but the search process may take a significant amount of time. As a result, a user that submitted the query may become frustrated and may also desire to receive results associated with subsequent queries in a more efficient manner.

SUMMARY

Described herein are techniques for utilizing a hybrid search method to identify information responsive to a query. More particularly, one or more pivots may be selected by searching a partitioning tree. The one or more pivots may be used to guide a search in a neighborhood graph, whereby the search in the neighborhood graph identifies nearest neighbors in close proximity to the query. When the search in the neighborhood graph is unable to identify, from the immediate neighborhood of previously identified nearest neighbors, additional nearest neighbors that are closer in proximity to the query than previously identified nearest neighbors, the search may dynamically switch to the partitioning tree. As a result, one or more additional pivots selected from the partitioning tree may used to guide a subsequent search in the neighborhood graph. In various embodiments, the selection of pivots and the search in the neighborhood graph may be performed utilizing an iterative algorithm.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is set forth with reference to the accompanying figures, in which the left-most digit of a reference number identifies the figure in which the reference number first appears. The use of the same reference numbers in the same or different figures indicates similar or identical items or features.

DETAILED DESCRIPTION

Figure 1:
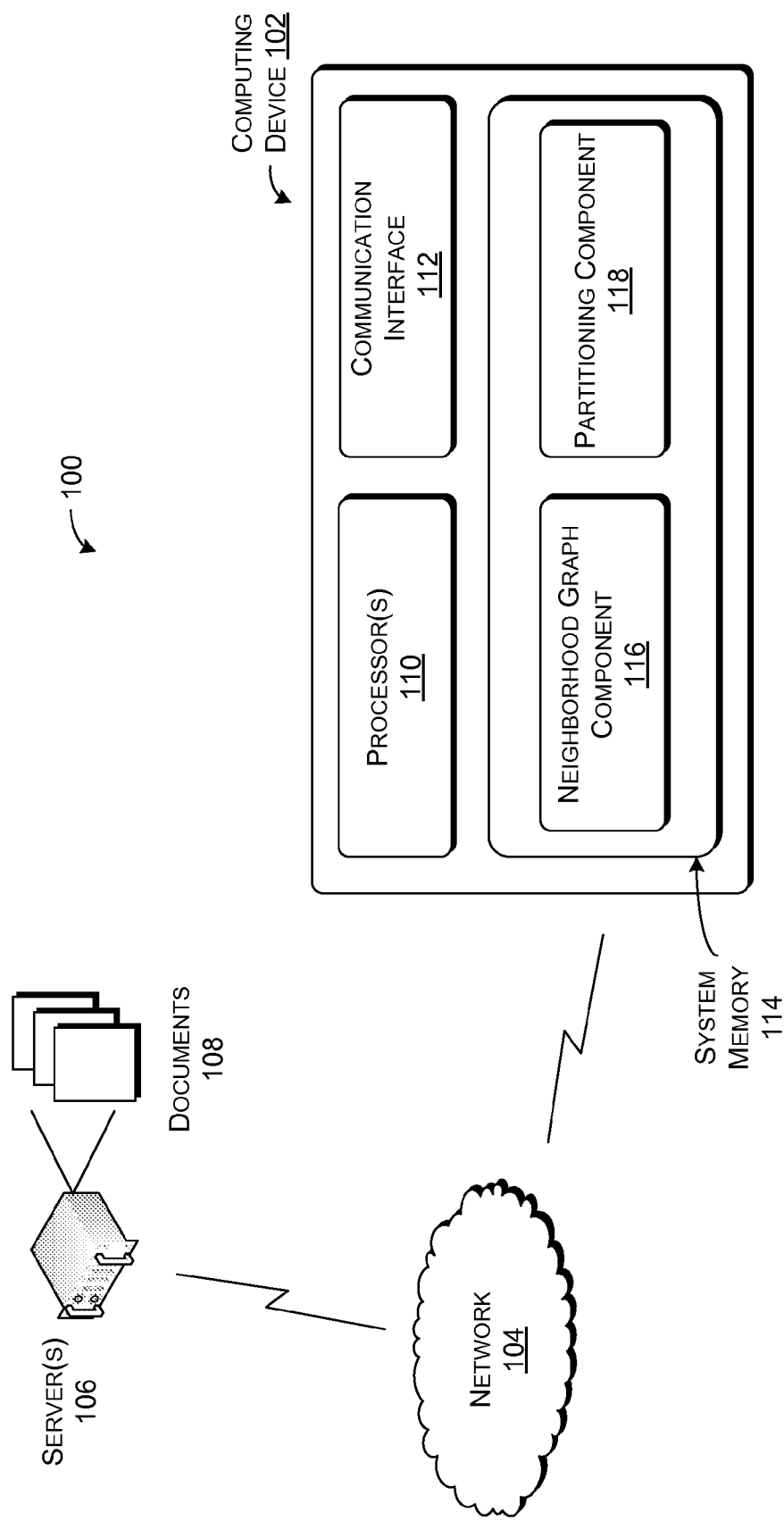
FIG. 1 illustrates a system for indexing visual descriptors using a neighborhood graph structure, in accordance with various embodiments.

Described herein are systems and/or techniques to utilize a neighborhood graph structure to index and search information associated with a query. More particularly, described herein are systems and/or techniques for using a neighborhood graph in conjunction with a partitioning tree to search and identify information in response to a query. For the purposes of this discussion, any type of tree structure may be utilized in conjunction with the neighborhood graph. However, "partitioning tree" will be used for the sake of consistency.

In various embodiments, a hybrid search approach is described in which pivots are identified and selected using a partitioning tree in order to more efficiently search for information responsive to a query in the neighborhood graph. Moreover, the search may be conducted using an iterative algorithm, where in each iteration, a search in partitioning trees is conducted to pick pivots for guiding a subsequent search in the neighborhood graph. Moreover, a new iteration may be triggered when the search in the neighborhood graph is unable to identify more exact nearest neighbor candidates, or in other words, points that have a good probability of being relevant and/or responsive to the query.

For the purposes of this discussion, a nearest neighbor search may relate to finding the closest points in a metric space. For instance, given a set of points S in a metric space M and a query point $q \in M$, a nearest neighbor search may include locating the closest point in S to q. Moreover, a k-nearest neighbor search may identify the top k nearest neighbors to a particular query. In addition, in an approximate nearest neighbor (ANN) search, it may be acceptable to retrieve a best, but not an exact, guess of a nearest neighbor to a query. In ANN, an algorithm may be utilized that may not actually guarantee the return of the actual nearest neighbor for every query but may instead find the nearest neighbor in a majority of cases, for example. Oftentimes, an ANN search may be used in order to improve the speed and/or memory savings associated with a search.

As mentioned above, existing methods of conducting searches (i.e., partitioning trees and/or hashing) for computer vision and multimedia (i.e., audio, video, etc.) may by themselves be inefficient and may take a significant amount of time to identify subject matter responsive to a query. For the purposes of this discussion, computer vision may refer to the ability of a machine to extract information from an image that is used to solve a particular task. An ANN search using partitioning trees may search for information by organizing data points using tree structures by recursively partitioning a space into a subspace, whereby each subspace is associated with a subset of the data points and corresponds to a subtree. Using the partitioning trees method described above, the query procedure may traverse the tree from the root to a leaf by evaluating the query at each internal node and expanding the subtrees (i.e., subspaces) down to the leaf nodes to get nearest neighbor candidates, in some order (e.g., depth-first or best-first). However, such a scheme takes a significant amount of time to locate the subspace that corresponds to a leaf node. Furthermore, the order of the search is often inefficient in that searching path does not quickly move towards and/or identify the true nearest neighbors.

Further, in hashing-based approaches, the query procedure may check a large number of NN candidates from buckets that may correspond to the same, or similar, hash codes with a query point. That is, the nearest neighbor candidates may be hashed utilizing one or more hash functions to ensure that for each hash function, the probability of collision is much higher for objects (points) that are close to each other than those far apart. Subsequently, one can determine the nearest neighbors by hashing the query. However, hashing-based techniques do not discriminate between points included in the buckets and there tends to be no optimized search order to access the buckets and/or the points included within the buckets. As a result, there may be a high time cost associated with checking the points that have a low probability of being the true nearest neighbors.

Therefore, in view of the inefficiencies associated with ANN utilizing partitioning trees, hashing, and/or other search methods, described herein are systems and methods for a hybrid search scheme to perform an iterative algorithm utilizing a neighborhood graph in conjunction with a partitioning tree. More particularly, described herein are systems and methods for utilizing a neighborhood graph in conjunction with a partitioning tree in order to obtain more relevant search results associated with a query. Various examples of searching for various types of content, in accordance with the embodiments, are described below with reference to FIGS. 1-5.

FIG. 1 illustrates a system 100 for conducting a query search utilizing a neighborhood graph in conjunction with a partitioning tree. More particularly, the system 100 includes a computing device 102, a network 104, one or more server(s) 106, and documents 108 associated with the server(s) 106. In various embodiments, the computing device 102 includes one or more processor(s) 110, a communication interface 112, and system memory 114. Moreover, the system memory 114 may include a neighborhood graph component 116 and a partitioning component 118.

In some embodiments, the network 104 may be any type of network known in the art, such as the Internet. Moreover, the computing device 102 may be communicatively coupled to the network 104 in any manner, such as by a wired or wireless connection. Further, the server(s) 106 may be any type of server known in the art, such as a web server. The server(s) 106 may store one or more of the documents 108, which may include documents accessible via the Internet. In various embodiments, the documents 108 may include video files, audio files, images, and/or any other type of content known in the art. As shown in FIG. 1, the computing device 102 may access the server(s) 106 and the corresponding documents 108 by way of the network 104.

The techniques and mechanisms described herein may be implemented by multiple instances of the computing device 102 as well as by any other computing device, system, and/or environment. The computing device 102 shown in FIG. 1 is only one example of a computing device and is not intended to suggest any limitation as to the scope of use or functionality of any computing device utilized to perform the processes and/or procedures described above.

In at least one configuration, the processor(s) 110 may execute one or more modules and/or processes to cause the computing device 102 to perform a variety of functions. In some embodiments, the processor(s) 110 are a CPU, a GPU, both CPU and GPU, or other processing units or components known in the art. Additionally, each of the processor(s) 110 may possess its own local memory, which also may store program modules, program data, and/or one or more operating systems.

In various embodiments, the communication interface 112 may allow the computing device 102 to communicate and/or interface with the network 104 and/or one or more devices, such as the server(s) 106. Moreover, the communication interface 112 may be any type of communication interface known in the art.

Depending on the exact configuration and type of the computing device 102, the system memory 114 may be volatile (such as RAM), non-volatile (such as ROM, flash memory, miniature hard drive, memory card, or the like) or some combination thereof. The system memory 114 may include an operating system, one or more program modules, and may include program data.

As mentioned previously, the system memory 114 may include the neighborhood graph component 116 and the partitioning component 118. It is appreciated that the system memory 114 may include components in addition to the foregoing components. Moreover, although FIG. 1 illustrates that these components are included within the system memory 114, it is contemplated that any one or both of the neighborhood graph component 116 and the partitioning component 118 may be stored on a different or remote device or devices, such as the server(s) 106. The foregoing components will be described in detail with respect to FIGS. 2-5.

The computing device 102 may have additional features and/or functionality. For example, the computing device 102 may also include additional data storage devices (removable and/or non-removable) such as, for example, magnetic disks, optical disks, or tape. Such additional storage may include removable storage and/or non-removable storage. Computer-readable media may include, at least, two types of computer-readable media, namely computer storage media and communication media. Computer storage media may include volatile and non-volatile, removable, and non-removable media implemented in any method or technology for storage of information, such as computer readable instructions, data structures, program modules, or other data. The system memory 114, the removable storage and the non-removable storage are all examples of computer storage media. Computer storage media includes, but is not limited to, RAM, ROM, EEPROM, flash memory or other memory technology, CD-ROM, digital versatile disks (DVD), or other optical storage, magnetic cassettes, magnetic tape, magnetic disk storage or other magnetic storage devices, or any other non-transmission medium that can be used to store the desired information and which can be accessed by the computing device 102. Any such computer storage media may be part of the computing device 102. Moreover, the computer-readable media may include computer-executable instructions that, when executed by the processor(s) 110, perform various functions and/or operations described herein.

In contrast, communication media may embody computer-readable instructions, data structures, program modules, or other data in a modulated data signal, such as a carrier wave, or other transmission mechanism. As defined herein, computer storage media does not include communication media.

The computing device 102 may also have input device(s) such as a keyboard, a mouse, a pen, a voice input device, a touch input device, etc. Output device(s), such as a display, speakers, a printer, etc. may also be included. A user may utilize the foregoing features to interact with the computing device 102, the network 104, and/or the server(s) 106. For instance, the computing device 102 may be used to perform a search in a neighborhood graph and/or a partitioning tree in response to receiving a query utilizing the techniques and/or processes described herein.

It is appreciated that the illustrated computing device 102 is only one example of a suitable device and is not intended to suggest any limitation as to the scope of use or functionality of the various embodiments described. Other well-known computing devices, systems, environments and/or configurations that may be suitable for use with the embodiments include, but are not limited to, personal computers, server computers, hand-held or laptop devices, multiprocessor systems, microprocessor-based systems, set top boxes, game consoles, programmable consumer electronics, network PCs, minicomputers, mainframe computers, distributed computing environments that include any of the above systems or devices, implementations using field programmable gate arrays ("FPGAs") and application specific integrated circuits ("ASICs"), and/or the like.

Figure 2:
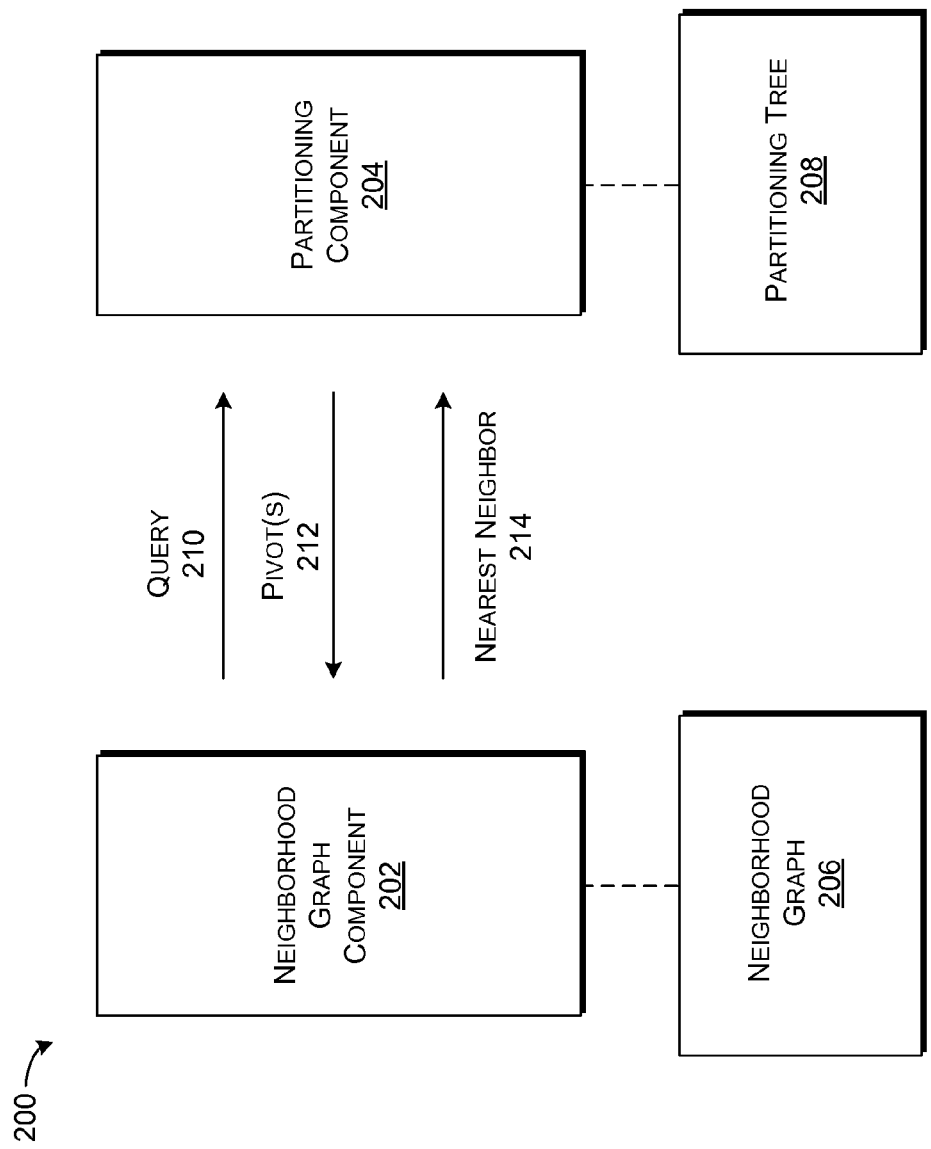
FIG. 2 is a flow diagram between components of a system that illustrates a hybrid search process utilizing a neighborhood graph and a partitioning tree, in accordance with various embodiments.

FIG. 2 illustrates a flow diagram 200 between components of a system for conducting searches using a neighborhood graph in combination with a partitioning tree (or any type of tree structure). In various embodiments, the system 200 includes a neighborhood graph component 202, a partitioning component 204, a neighborhood graph 206, and a partitioning tree 208. Moreover, the system 200 further includes a query 210, one or more pivot(s) 212, and a nearest neighbor 214. In above embodiments, the neighborhood graph component 202 and the partitioning component 204 may be included within the computing device 102 and may refer to neighborhood graph component 116 and partitioning component 118, respectively, as illustrated in FIG. 1. Moreover, the neighborhood graph component 202 and the partitioning component 204 may be communicatively coupled to and/or may access and search the neighborhood graph 206 and the partitioning tree 208, respectively. The partitioning tree 208 may also be referred to as a kd-tree.

In some embodiments, the system 200 may receive the query 210, such as a query requesting a multimedia file (i.e., audio file, video file, etc.). However, it is contemplated that the query 210 may relate to a request for any type of information known in the art. To conduct a search with respect to the query 210, the neighborhood graph 206 may be searched. For the purposes of this discussion, the neighborhood graph 206 may correspond to an undirected graph that is used to organize points by connecting each data point with its neighboring points. More particularly, the query 210 may be identified in the neighborhood graph 206 as a query point. It is contemplated that points in the neighborhood graph 206 that are in close proximity to a point that is close to the query 210 may have a higher probability of also being close to that query 210. Therefore, the neighborhood graph component 202 may search the neighborhood graph 206 beginning at a point in relative close proximity to the query 210. From this data point, the neighborhood graph component 202 may conduct a best-first strategy to search the neighborhood of that particular point, which may be referred to as the current best nearest neighbor 214. As a result, since a point in close proximity to the query 210 is searched in an attempt to identify the nearest neighbor 214 that is in closer proximity to the query 210, the time overhead to access a new nearest neighbor 214 may be significantly reduced.

However, prior to searching the neighborhood graph 206 for a nearest neighbor 214 in close proximity to the query 210, the system 200 may select a starting point for searching the neighborhood graph 206. In various embodiments, this starting point may be referred to as a pivot 212 or a nearest neighbor candidate. That is, since the search of the neighborhood graph 206 may begin with the pivots 212, the pivots 212 may be used to guide the search that takes place in the neighborhood graph 206. If the search in the neighborhood graph 206 begins with a pivot 212 that is in close proximity to the query 210, as opposed to a point that is more distant from the query 210, the amount of time taken to identify the nearest neighbor 214 may be significantly reduced. Consequently, the process of identifying search results (i.e., nearest neighbors 214) responsive to the query 210 may be more efficient and would likely return the search results to a user that submitted the query 210 in a more expedient manner.

In various embodiments, and as mentioned above, the pivot(s) 212 (or nearest neighbor candidates) that are used to begin the search the neighborhood graph 206 may be selected by the partitioning component 204 from the partitioning tree 208. To determine the number of pivots 212 to be selected and to help ensure that the selected pivots 212 are satisfactory nearest neighbor candidates that will allow the neighborhood graph component 202 to identify the nearest neighbor 214 in the neighborhood graph 206 closest to the query 210, a hybrid search scheme is implemented. In particular, the hybrid search scheme may use an iterative algorithm, in which a new iteration of the search may be automatically triggered when the neighborhood graph 206 search in the previous iteration is unable to efficiently locate a better nearest neighbor 214 corresponding to the query 210. The cause of the new iteration may be referred to as a triggering event.

When a triggering event occurs, a new iteration of the search may be performed, meaning that the partitioning tree 208 and then the neighborhood graph 206 may be searched. Moreover, the partitioning component 204 may search the partitioning tree 208 by dynamically and adaptively selecting pivots 212 to help guide the subsequent search in the neighborhood graph 206. That is, the system 200 may utilize an iterative algorithm, which is described in detail below, to perform a search in response to the query 210 by automatically switching between searching in the partitioning tree 208 and the neighborhood graph 206, in which the search in the partitioning tree 208 plays the role of adaptively and dynamically picking the pivots 212 to better guide the neighborhood graph 206 search.

With respect to FIG. 2, and as mentioned previously, the system 200 may receive the query 210, which may also be identified in the neighborhood graph 206. Upon receiving the query 210, the partitioning component 204 may search the partitioning tree 208 to select one or more pivots 212 that are in relative close proximity to the query 210. In various embodiments, the pivots 212 may be selected based on their respective relevance and/or responsiveness to the query 210. Therefore, selection of the pivots 212 from the partitioning tree 208 may be dependent upon the particular query 210. The neighborhood graph component 202 may then utilize one or more of the pivots 212 to begin the search in the neighborhood graph 206. More particularly, utilizing the selected pivots 212 as a starting point, the neighborhood graph component 202 may search for points within a neighborhood of the selected pivots 212 that are in closer proximity to the query 210 than the selected pivots 212. A point that is closer to the query 210 than the pivots 212 may be referred to as the nearest neighbor 214.

In various embodiments, the neighborhood graph component 202 may continue to search in the neighborhood graph 206 for nearest neighbors 214 within the neighborhood of the selected pivot 212 that are closer in proximity to the query 210 than a previously identified closest nearest neighbor 214. For instance, provided that a pivot 212 in the neighborhood graph 206 has been selected from the partitioning tree 208. Moreover, assume that this pivot 212 has an associated neighborhood in which nearest neighbor candidates may be identified. In this example, further assume that a first nearest neighbor candidate that is closer in proximity to the query 210 than the selected pivot 212 is identified. If a second nearest neighbor candidate that is closer to the query 210 than the first nearest neighbor candidate is identified, the second nearest neighbor candidate may then constitute the closest nearest neighbor 214. The neighborhood graph component 202 may continue to search the neighborhood graph 206 for nearest neighbor candidates that are closer to the query 210 than the second nearest neighbor candidate, and so on. As a result, the neighborhood graph component 202 may search the neighborhood graph 206 for the nearest neighbor 214 within the neighborhood of the selected pivot 212 that is closest in proximity to the query 210. The above example is illustrated in additional detail in FIG. 3, which will be described below.

In other embodiments, once the neighborhood graph component 202 is unable to identify, from the immediate neighborhood of previously identified nearest neighbors, an additional nearest neighbor 214 that is closer in proximity to the query 210 than the previously identified closest nearest neighbor 214 (i.e., a triggering event), the search may automatically and/or dynamically switch back to the partitioning component 204. At this point, the partitioning component 204 may search the partitioning tree 208 for additional pivots 212 that will be used to guide a subsequent search in the neighborhood graph 206. Therefore, the system 200 illustrated in FIG. 2 may represent a single iteration of the search algorithm mentioned above and described in detail below. Furthermore, after the neighborhood graph component 202 is unable to efficiently identify closer nearest neighbors 214 in the neighborhood graph 206, a subsequent iteration may be triggered. In this next iteration, the partitioning component 204 may search the partitioning tree 208 to select pivots 212 that will help guide the search in the neighborhood graph 206. The foregoing search process may continue until the true nearest neighbor 214 is identified, in which the true nearest neighbor 214 may represent a search result(s) that is most responsiveness to the previously submitted query (e.g., query 210).

Therefore, as shown above, the system 200 illustrated in FIG. 2 may search for information responsive to the query 210 by dynamically switching between searches in the neighborhood graph 206 and the partitioning tree 208. By performing an iterative search using both the neighborhood graph 206 and the partitioning tree 208, the system 200 may be able to more efficiently identify points that are closest in proximity and, thus, most responsive and/or relevant to the query 210. That is, such a hybrid search approach enables the system 200 to more efficiently identify information that is most responsive to what is being requested in the query 210.

Figure 3:
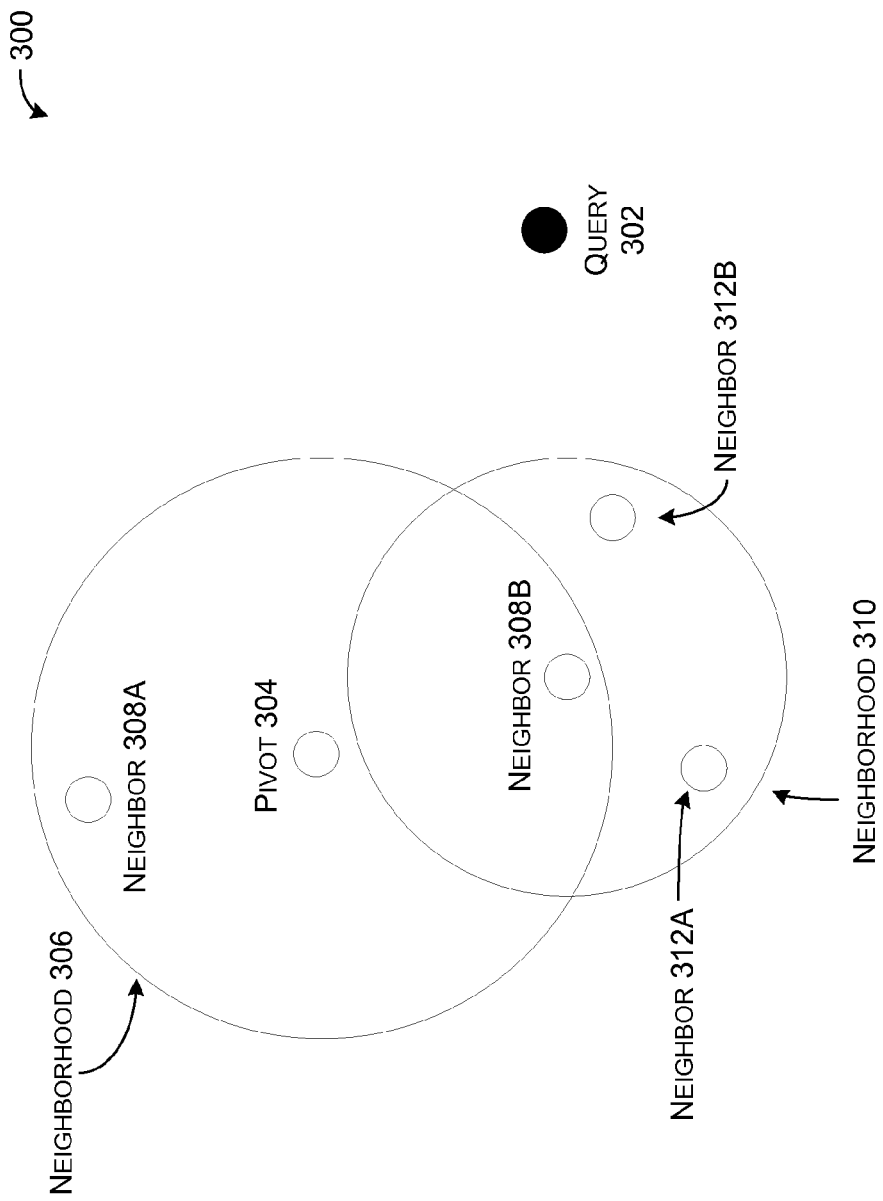
FIG. 3 is a diagram illustrating a neighborhood graph associated with a particular query, in accordance with various embodiments.

FIG. 3 illustrates a neighborhood graph 300 for searching for information responsive to a query 302, which is shown as a point in the neighborhood graph 300 that represents an illustrative landscape of potential search results. More particularly, the neighborhood graph 300 may correspond to neighborhood graph 206, as illustrated in FIG. 2, and may include a pivot 304, a neighborhood 306, neighbors 308A and 308B, a neighborhood 310, and neighbors 312A and 312B. In various embodiments, the query 302 may correspond to query 210 and the pivot 304 may correspond to any one of pivots 212. Moreover, the neighborhood graph 300 illustrated in FIG. 3 may be utilized in conjunction with a partitioning tree to identify a nearest neighbor with respect to the query 302.

As stated previously with respect to FIG. 2, the query 302 may request a particular type of information, such as an image, an audio file, or a video file, for example. As shown in FIG. 3, the query 302 is represented by a query point on the neighborhood graph 300. Upon receiving the query 302, the pivot 304 may be selected for the neighborhood graph 300. In various embodiments, the pivot 304 may be selected by searching a partitioning tree, such as partitioning tree 208, for example. Moreover, the pivot 304 may be selected by the partitioning component 204 to guide the search in the neighborhood graph 300 and may also constitute a starting point for guiding and conducting the search of the neighborhood graph 300. Once the pivot 304 has been selected, the neighborhood 306 associated with the pivot 304 may be searched for neighbors (e.g., neighbors 308A and 308B) that are closer in proximity to the query 302 than the pivot 304 (i.e., nearest neighbor 214).

For instance, as shown in FIG. 3, neighbor 308B appears to be closer in proximity to the query 302 than either the pivot 304 or the other neighbor 308A within the neighborhood 306. Accordingly, neighbor 308B may be considered the nearest neighbor in the neighborhood 306 corresponding to the pivot 304. In various embodiments, the neighborhood graph 300 will be searched until it can no longer efficiently identify neighbors within the neighborhood 306 that are closer in proximity to the query 302. If no other neighbors within the neighborhood 306 can be efficiently identified, a subsequent iteration of the search may be triggered (i.e., triggering event). In other words, the search may be dynamically switched from the neighborhood graph 300 to the partitioning tree, whereby the partitioning tree may be searched for one or more additional pivots that can be used to guide a subsequent search of the neighborhood graph 300.

As stated above, as a result of the search in the partitioning tree, one or more additional pivots may be identified and selected. In various embodiments, the selected pivot may correspond to the nearest neighbor 308B identified in the previous search of the neighborhood graph 300 or a pivot not yet identified in the search of the neighborhood graph 300. In the example illustrated in FIG. 3, the pivot selected by the partitioning tree is neighbor 308B. Accordingly, neighbor 308B may be utilized to guide the search in the neighborhood graph 300 for the subsequent iteration of the search. In this example, the neighborhood 310 corresponding to neighbor 308B may then be expanded and searched for neighbors that are closer in proximity to the query 302. In these embodiments, neighbors 312A and 312B have been identified as being neighbors within the neighborhood 310. Since neighbor 312B appears to be in closer proximity to the query 302 than either neighbor 308B or neighbor 312A, neighbor 312B may be considered the nearest neighbor for this iteration of the search.

As stated previously, if no other closer neighbors can be identified, a subsequent iteration of the search may again be triggered and the hybrid search process between the neighborhood graph 300 and the partitioning tree may be repeated until a true nearest neighbor corresponding to the query 302 can be identified. In other embodiments, neighbor 312B may constitute the true nearest neighbor associated with the query 302 if the search in the neighborhood graph 300 is unable to yield any additional neighbors that are closer in proximity to the query 302 than neighbor 312B. In this example, neighbor 312B may be considered the search result and/or information that is most responsive to the query 302. Therefore, in response to receiving the query 302, the neighborhood graph 300 and the partitioning tree may conduct searches in conjunction with one another in order to identify information responsive to the query 302. Moreover, the nearest neighbor identified by the neighborhood graph 300, which may be guided by the search in the partitioning tree and the subsequently selected pivot 304, may constitute the information that is most relevant to the query 302. By utilizing a hybrid searching technique, the search process may be more efficient, less time-consuming, and may result in information that is most responsive to the query 302.

As stated above, and referring back to FIG. 2, the search associated with the neighborhood graph 206 and the partitioning tree 208 may be conducted utilizing an iterative algorithm (referred to below as Algorithm 1). With respect to Algorithm 1, R may correspond to a result set with a fixed size, Q may refer to a priority queue, G may correspond to a neighborhood graph (i.e., neighborhood graph 206), V[G] may refer to a node set of G, n may correspond to the number of accessed points in G, m may refer to the number of promising points (i.e., nearest neighbor candidates), T may correspond to a partitioning tree (i.e., partitioning tree 208), and r may refer to the number of accessed points from T. Algorithm 1 is set forth below:

| Algorithm 1 |
| --- |
| 1.     for each u ∈ V[G] |
| 2.         color [u] ← WHITE; |
| 3.     end for |
| 4.     n ← 0; |
| 5.     m ← 0; r ← 0; |
| 6.     P ← PICKPIVOTSFROMTREE (q, T) |
| 7.     for each u ∈ P do |
| 8.         key [u] ← dist (u, q); color [u] ← BLACK; |
| 9.         Q ← u; |
|            if MAX(R) > u then |
|               R ← v; |
|            end if |
| 10.        n ← n + 1; |
| 11.        m ← m + 1; r ← r + 1; |
| 12.    end for |
| 13.    t ← 0; |
| 14.    while (Q ≠ ∅ && n < N) do |
| 15.        u ← EXTRACT-MIN (Q); |
| 16.        m ← m − 1; b ← FALSE; |
| 17.        for each v ∈ Adj[u] do |
| 18.            if color [v] ≠ BLACK then |
| 19.               color [v] ← BLACK; key [v] ← dist (v, q); |
| 20.               Q ← v; |
|               if MAX(R) > u then |
|                   R ← v; |
|               end if |
| 21.            n ← n + 1; |
| 22.            if v ∈ R then |
| 23.               m ← m + 1; b ← TRUE; |
| 24.            end if |
| 25.           end if |
| 26.        end for |
| 27.        if b == FALSE then |
| 28.            t ← t + 1; |
| 29.        else |
| 30.            t ← 0; |
| 31.        end if |
| 32.        if (m <= 0 || t >= F) && (r/n < L) then |
| 33.            P ← PICKPIVOTSFROMTREE-RESUME (q, T); |
| 34.            for each u ∈ P do |
| 35.               key [u] ← dist (u, q); color [u] ← BLACK; |
| 36.               Q ← u; |
|               if MAX(R) > u then |
|                   R ← v; |
|               end if |
| 37.               n ← n + 1; m ← m + 1; r ← r + 1; |
| 38.            end for |
| 39.            if t >= F then |
| 40.               t ← 0; |
| 41.            end if |
| 42.        end if |
| 43.    end while |
| 44.    return R; |

In view of Algorithm 1, given a set of n data points $X=\{x_1, \ldots, x_n\}$, with $x_i \in R^k$ being a k-dimensional point, a data structure may be built to index these points so that the nearest neighbors of query $x_q$ can be identified quickly and efficiently. As stated above the neighborhood graph 206 may correspond to an undirected graph that is used to organize data points by connecting each data point with its neighboring data points. In various embodiments, the neighborhood graph 206 described above may be denoted as Equation 1, as set forth below:

$$G=\{(v_i, Adj[v_i])\}_{i=1}^n, \quad (1)$$

where $v_i$ may correspond to a point $x_i$ and $Adj[x_i]$ may refer to a set of nodes that corresponds to its neighbors in the neighborhood graph 206.

As mentioned above, the neighborhood graph 206 may be searched for ANNs by starting from one or several pivots 212, and propagating the search by accessing neighbors of the one or several pivots 212 to traverse the neighborhood graph 206. Usually, a best-first strategy may be used to first access points with higher probabilities of being the true nearest neighbors. In order to organize the accessed points (i.e., previously identified nearest neighbors 214), a priority queue may be used to maintain the accessed points and to initially contain the pivots 212. The current best nearest neighbor candidate in the priority queue may be extracted (i.e., pivot 304) and its neighborhood (i.e., neighborhood 306) may be expanded. The resulting search path attempts to move closer to the query 302 point without having to analyze repeating points.

Before conducting the search in the neighborhood graph 206, pivots 212 may be selected to help guide the search. The pivots 212 may be selected by random sampling and clustering. However, because the pivots 212 are selected randomly, the pivots 212 are likely to be independent from a particular query 210 and, therefore, may not be satisfactory to guide the search in the neighborhood graph 206 for that specific query 210. Moreover, a single pivot may also be generated by selecting the first candidate from the partitioning tree 208. Yet, the first candidate may not be in close proximity to the particular query 210 in question. Moreover, a search in the neighborhood graph 206 beginning with an unsatisfactory starting point (i.e., a starting point not in close proximity to the query 210) may result in additional time being spent accessing points that have a lower likelihood of constituting the true nearest neighbors.

A more efficient method of selecting pivots 212 to guide the neighborhood graph 206 search may be a query-dependent pivot selection method, in which the search in the partitioning tree 208 is combined with search in the neighborhood graph 206. More particularly, the pivots 212 may be dynamically and adaptively selected from the partitioning tree 208 to more effectively and efficiently guide the search in the neighborhood graph 206. In various embodiments, multiple candidates may be selected from the partitioning tree 208 as pivots 212 at the beginning of the search process. It is contemplated that the number of pivots 212 selected from the partitioning tree 208 may be any number of points that could be used to guide the search in the neighborhood graph 206. Moreover, the number of candidates selected may be based at least in part on Algorithm 1.

In other embodiments, and as stated above, pivot 212 selection may be based on a hybrid search strategy in which alternate searches in the partitioning tree 208 and the neighborhood graph 206 may be conducted. As a result, pivot 212 selection may be automatically triggered in the search process so that the search can efficiently switch from the current nearest neighbor candidates to better nearest neighbor candidates rather than having to access all the points in the neighborhood graph 206 in an attempt to identify the true nearest neighbors. In particular, the partitioning tree 208 may be used to guide the neighborhood graph 206 search so that regions in closer proximity to the query 210 may be accessed once the neighborhood graph 206 search is unable to identify candidates that are closer and, therefore, more responsive to the query 210. Likewise, regions that are more distant to the query 210 may be disregarded since points falling in those regions may have a lower likelihood of being responsive to the query 210.

In various embodiments, the hybrid search process described above may be conducted using an iterative algorithm, such as the iterative algorithm set forth in Algorithm 1. In this embodiment, each iteration of the iterative algorithm may constitute subsequent searches in the partitioning tree 208 and the neighborhood graph 206, where the search in the partitioning tree 208 may yield pivots 212 that are expected to better guide the subsequent iteration of the search in the neighborhood graph 206. Moreover, the new iteration may be triggered when the neighborhood graph 206 search can no longer quickly and/or efficiently identify better nearest neighbor candidates. In various embodiments, this may be referred to as reaching local solutions. Once a new iteration is triggered, additional pivots 212 may then be selected by searching the partitioning tree 208.

In other embodiments, in order to determine when a new iteration should be triggered (i.e., switching from the search from the neighborhood graph 206 to the partitioning tree 208), the immediate unaccessed neighbors of the boundary nodes in the subgraphs formed by the accessed points may be checked. Instead of inspecting the unaccessed neighbors after expanding a node in the neighborhood graph 206, an indication variable may be used to record the number of promising points in the priority queue maintained for the neighborhood graph 206 search. Moreover, it can be assumed that the search arrives at local solutions (i.e., the closest nearest neighbor) when the indication variable reaches zero. For the purposes of this discussion, a promising point may denote a point whose distance to the query 210 is smaller than the distance of its parent to the query 210, which may mean that the immediate neighbors of the promising points may have a higher likelihood of containing better nearest neighbor candidates. The promising points may also be defined as the points whose distance to the query 210 is not larger than $(1+\sigma)\bar{d}$, with $\bar{d}$ being the worst distance in the current ANNs and a representing some small value.

It is contemplated that when the pivots 212 are selected, an additional search in the neighborhood graph 206 may needed to determine the true nearest neighbors. Although the pivots 212 may constitute satisfactory nearest neighbor candidates, the pivots 212 may still be relatively distant from the true nearest neighbors. Therefore, although the search path through the neighborhood graph 206 may have a high likelihood of getting closer to the true nearest neighbors, the search within the neighborhood graph 206 may not be able to move quickly to better (i.e., closer to the query 210) regions in the neighborhood graph 206. Consequently, the system 200 may trigger the switch of the search for the true nearest neighbors from the neighborhood graph 206 to the partitioning tree 208. More particularly, when the number of successive neighborhood expansions that fail to yield promising points exceeds a predetermined value, the search may be switched from the neighborhood graph 206 to the partitioning tree 208. In various embodiments, the predetermined value may correspond to a fixed constant of any number.

After one or more iterations of the hybrid search process, the search in the neighborhood graph 206 may arrive at local solutions (i.e., nearest neighbors) more frequently and, therefore, the switch to searching in the partitioning tree 208 may also occur more frequently. Accordingly, the search at these later stages may aim to conduct a finer search in order to identify the true nearest neighbors. However, since the overhead (i.e., time, cost, etc.) of searching the partitioning tree 208 may be larger than in the neighborhood graph 206, it may be beneficial and more efficient to search the partitioning tree 208 less frequently. To this end, a search scheme may be introduced that attempts to balance the number of points accessed in the partitioning tree 208 and the neighborhood graph 206 so that the points from the partitioning tree 208 do not exceed a fraction of the total accessed points. Moreover, it is contemplated that the foregoing search scheme may not only be used in later states of the search, but can also be utilized anytime during the entire search process.

With respect to searching within the partitioning tree 208, in order to reduce the time overhead while selecting pivots that will allow the system 200 to efficiently identify the true nearest neighbor, a single leaf node may be selected as the pivot 212 from the subtree. In various embodiments, the leaf node may have a height that is equal to some fixed number $\hat{h}$. Further, an additional attribute, which may correspond to the height of the subtree, may be associated with each node of the partitioning tree 208. In this embodiment, subtrees having heights greater than $\hat{h}$ may be included in the priority queue maintained for the search in the partitioning tree 208.

In some embodiments, the search process in the neighborhood graph 206 and the partitioning tree 208 may terminate if the number of accessed points reaches a particular threshold or if the true nearest neighbor(s) are found. Moreover, the hybrid search scheme may have a stop condition to determine whether the true nearest neighbor(s) have been found. In the above embodiments, the stop condition may occur when the best lower bound in the priority queue maintained for the search in the partitioning tree 208 is larger than the worst distance $\bar{d}$ in the current ANNs. Additionally, the hybrid search scheme also includes a speedup scheme to eliminate distance computation for the points that have a low likelihood of being true nearest neighbors. For instance, these points may be eliminated if other points exist that are closer in proximity to the query 210. Furthermore, the distances between neighboring points in the neighborhood graph 206 may be recorded, which may be used to estimate the lower bound of the distance to the query 210. In an example embodiment, assume that the distance from an accessed point u to the query q is denoted as d(u, q) and the pre-computed distance from the point u to its neighbor point v is denoted by d(u, v). In this embodiment, $d(v, q) \geq |d(u, q) - d(u, v)|$. Furthermore, the distance computation d(v, q) could be eliminated if $d(p^*, q)(=\bar{d}) < |d(u, q) - d(u, v)|$ holds, with $d(p^*, q)$ being the worst distance in the current ANNs. This elimination may save time and it is possible that the neighborhood of v contains closer nearest neighbor candidates.

Figure 4:
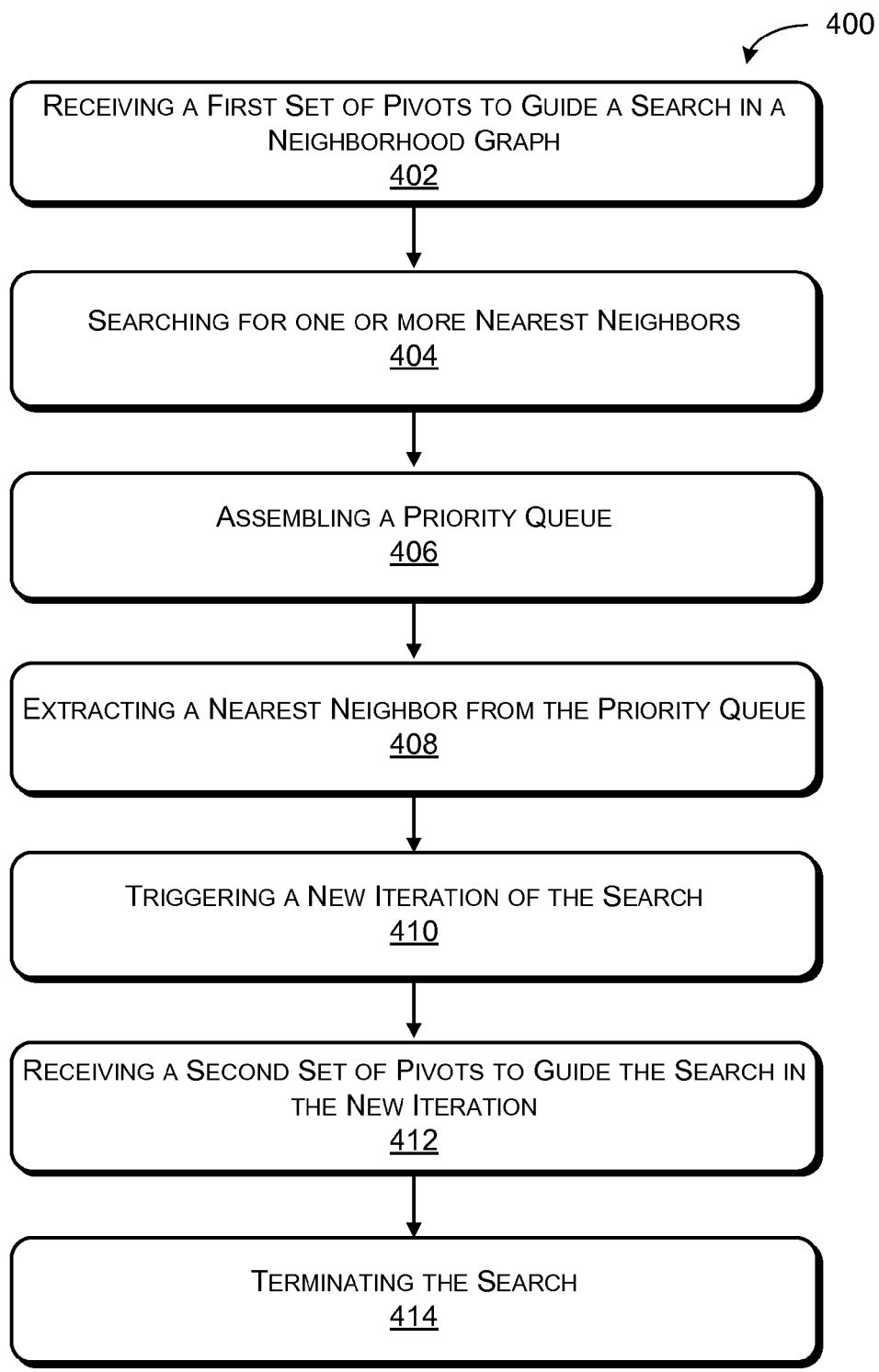
FIG. 4 is a flowchart of an illustrative process to search a neighborhood graph for information associated with a query.
Figure 5:
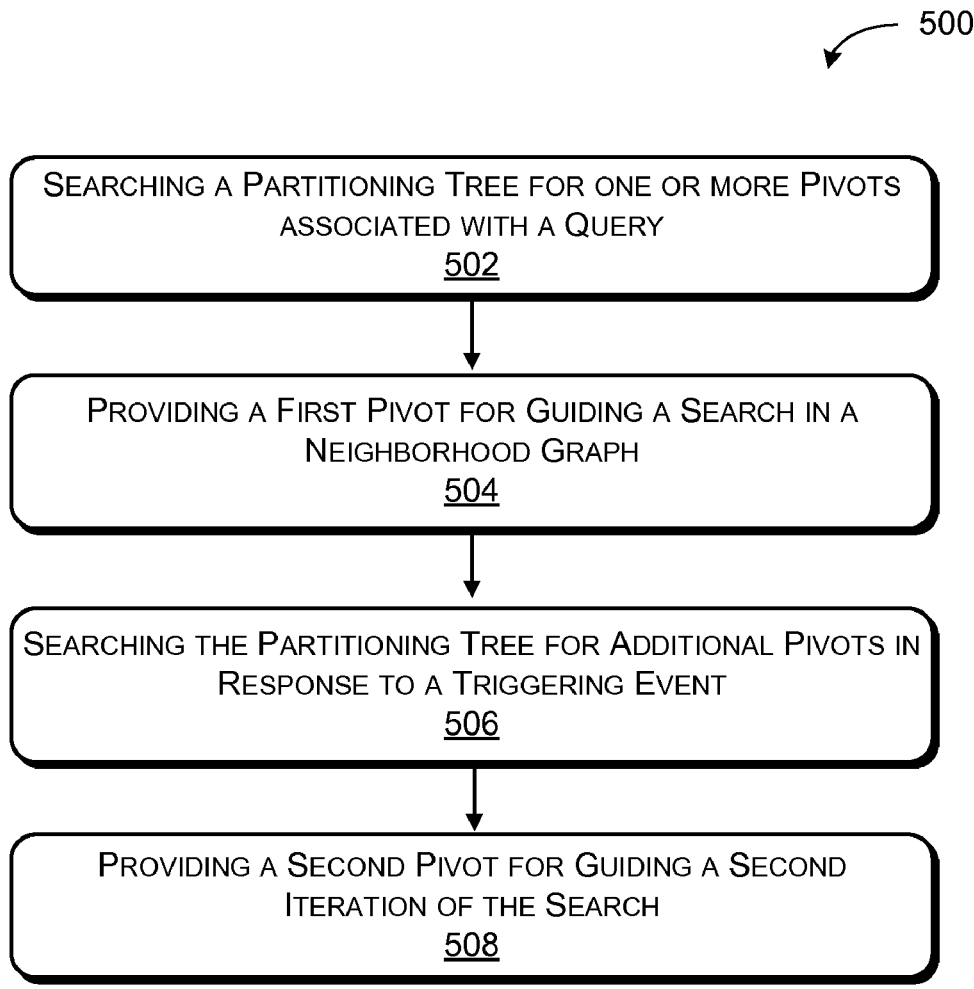
FIG. 5 is a flowchart of an illustrative process to provide one or more pivots for guiding a search in a neighborhood graph.

FIGS. 4 and 5 illustrate various example processes for searching for information responsive to a query using a neighborhood graph and/or a partitioning tree. The example processes are described in the context of the systems of FIGS. 1-3, but are not limited to those environments. The order in which the operations are described in each example process is not intended to be construed as a limitation, and any number of the described blocks can be combined in any order and/or in parallel to implement each process. Moreover, the blocks in the FIGS. 4 and 5 may be operations that can be implemented in hardware, software, and a combination thereof. In the context of software, the blocks represent computer-executable instructions that, when executed by one or more processors, cause one or more processors to perform the recited operations. Generally, the computer-executable instructions may include routines, programs, objects, components, data structures, and the like that cause the particular functions to be performed or particular abstract data types to be implemented.

FIG. 4 is a flowchart illustrating a process 400 of searching for information responsive to a query utilizing a neighborhood graph. It is contemplated that the operations illustrated in FIG. 4 may be performed by neighborhood graph components 116 and/or 202. Moreover, the operations set forth below may be performed utilizing an iterative algorithm, such as Algorithm 1, which is described in detail with respect to FIGS. 2 and 3.

More particularly, block 402 illustrates receiving a first set of pivots to guide a search in a neighborhood graph. In various embodiments, the first set of pivots may correspond to pivots 212 and/or pivot 304 and the neighborhood graph may correspond to neighborhood graph 206 and/or neighborhood 300. Moreover, the first set of pivots may be received in response to a query and may include one or any number of pivots. The first set of pivots may also be utilized as a starting point for guiding a search in the neighborhood graph. Additionally, the first set of pivots may be selected based on a search of a partitioning tree.

Block 404 illustrates searching for one or more nearest neighbors. In various embodiments, the nearest neighbors may correspond to nearest neighbor 214 and/or nearest neighbors 308A, 308B, 312A, and/or 312B. More particularly, the one or more nearest neighbors may be searched for within a neighborhood associated with the first set of pivots and the one or more nearest neighbors may be in closer proximity to the query than the first set of pivots. That is, the search may attempt to identify nearest neighbors that are closer in proximity and, therefore, are more relevant and/or responsive to the query. Moreover, nearest neighbors that are closer in proximity to the query may be more likely to be relevant to the query than nearest neighbors that are further in proximity to the query.

Block 406 illustrates assembling a priority queue. In various embodiments, the priority queue may be assembled such that it maintains the one or more nearest neighbors and the first set of pivots. It is contemplated that the priority queue may include points (i.e., nearest neighbors) that are in relative close proximity to the query. In other embodiments, the priority queue may serve as a resource for the search in the neighborhood graph. For instance, if the search in the neighborhood graph is unable to identify additional points that are closer in proximity than previously identified points, the neighborhood graph may utilize points maintained in the priority queue to guide a subsequent search in the neighborhood graph.

Block 408 illustrates extracting a nearest neighbor from the priority queue. More particularly, a particular one of the one or more nearest neighbors included in the priority queue may be extracted and a neighborhood associated with that nearest neighbor may be expanded and searched. In this embodiment, the extracted nearest neighbor may have a corresponding neighborhood that maybe searched in order to identify additional nearest neighbors that may be in closer proximity to the query. As a result, the search process may attempt to continuously identify nearest neighbors that are closer in proximity to the query or are a true nearest neighbor. In various embodiments, a true nearest neighbor may correspond to information that is highly relevant and/or responsive to the query.

Block 410 illustrates triggering a new iteration of the search. More particularly, a new iteration of the search may be triggered when a search is unable to identify additional nearest neighbors that are in closer proximity to the query than previously identified nearest neighbors within the neighborhood. That is, if the search is unable to identify nearest neighbors that are closer (i.e., more relevant) to the query, a triggering event may occur. In some embodiments, the triggering event may cause the search to dynamically and/or automatically switch from the neighborhood graph to the partitioning tree, thereby creating a hybrid search involving the neighborhood graph and the partitioning tree. Moreover, the triggering event may result in a subsequent iteration of the search. In other embodiments, a new iteration of the search may be triggered when a number of successive neighborhood expansions in the neighborhood graph exceeds a threshold. For instance, assuming that the threshold was three expansions, if the search had failed to identify any additional nearest neighbors that are closer in proximity to the query on three different occasions, a new iteration of the search may be triggered, thus causing the search to switch from the neighborhood graph to the partitioning tree.

As mentioned previously, the search in the neighborhood graph may identify a plurality of nearest neighbors, with some having a higher likelihood of constituting a true nearest neighbor than others. Accordingly, since some nearest neighbors may have a low probability of being responsive and/or relevant to the query, nearest neighbors that have a low probability of being a true nearest neighbor with respect to the query may be eliminated.

Block 412 illustrates receiving a second set of pivots to guide the search in the new iteration. In various embodiments, a triggering event may cause the search to switch from the neighborhood graph to the partitioning tree. Since the search in the neighborhood graph is unable to identify better nearest neighbors, the partitioning tree may be searched to select one or more additional pivots to guide a subsequent search in the neighborhood graph. Therefore, selecting the second set of pivots from the partitioning tree and conducting a subsequent search in the neighborhood graph may constitute the new iteration and a single iteration of the search. Furthermore, it is contemplated that the second set of pivots may include one pivot or multiple pivots.

Block 414 illustrates terminating the search. More specifically, the search may be terminated when a number of identified nearest neighbors exceeds a threshold or when a true nearest neighbor associated with the query is identified. For example, if the search process has identified a true nearest neighbor that is highly relevant to the query, the search may be terminated.

FIG. 5 is a flowchart illustrating a process 500 of searching for information responsive to a query utilizing a partitioning tree and a neighborhood graph. In various embodiments, the operations set forth in FIG. 5 may be performed by partitioning component 118 and/or partitioning component 204. Furthermore, such operations may also be performed utilizing an iterative algorithm, such as Algorithm 1, for example, which is described in detail with respect to FIGS. 2 and 3.

In particular, block 502 illustrates searching a partitioning tree for one or more pivots associated with a query. In various embodiments, the partitioning tree may correspond to partitioning tree 208, the one or more pivots may correspond to pivots 212 and/or pivot 304, and the query may correspond to query 210 and/or query 302. More particularly, the one or more pivots may be selected in order to guide a search in a neighborhood graph. Moreover the first pivot may be selected based at least in part on its relevance and/or a responsiveness to the query.

Block 504 illustrates providing a first pivot for guiding a search in a neighborhood graph. In some embodiments, and as mentioned previously, the first pivot may be utilized to search for nearest neighbors within a neighborhood of the first pivot in the neighborhood graph. That is, the first pivot may be used as a starting point for the search in the neighborhood graph.

Block 506 illustrates searching the partitioning tree for additional pivots in response to a triggering event. More particularly, the partitioning tree may be searched for additional pivots when the search in the neighborhood graph is unable to identify nearest neighbor candidates that are closer in proximity to the query than previously identified nearest neighbors. When such a triggering event occurs, the search may be automatically switched from the neighborhood graph to the partitioning tree. As a result, a second iteration of the search may occur in both the neighborhood graph and the partitioning tree.

Block 508 illustrates providing a second pivot for guiding a second iteration of the search. In some embodiments, once the triggering event is detected, the search may be switched to the partitioning tree, which then may select a second pivot for guiding a subsequent search in the neighborhood graph. The search for the second pivot and utilizing the second pivot as a guide to searching the neighborhood graph may constitute a second iteration of the search.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

The invention claimed is:

1. A system comprising:

a processor; and memory communicatively coupled to the processor for storing:

a partitioning component that, in response to receiving a query, selects one or more pivots from a partitioning tree to guide a search associated with the query in a neighborhood graph; and a neighborhood graph component that utilizes the one or more pivots to search, in the neighborhood graph, for one or more nearest neighbors that are in closer proximity to the query than the one or more pivots, in which the partitioning tree is searched for additional pivots when the search is unable to identify the one or more nearest neighbors that are closer in proximity to the query than previously identified nearest neighbors.

2. The system as recited in claim 1, wherein operations performed by the partitioning component and the neighborhood graph component are conducted using an iterative algorithm.

3. The system as recited in claim 1, wherein selecting the one or more pivots and searching for the one or more nearest neighbors constitutes a single iteration of the search.

4. The system as recited in claim 1, wherein a new iteration of the search is triggered when the neighborhood graph component is unable to identify, from the immediate neighborhood of previously identified nearest neighbors, additional nearest neighbors that are closer in proximity to the query than previously identified nearest neighbors.

5. The system as recited in claim 1, wherein a new iteration of the search is triggered when a number of successive neighborhood expansions in the neighborhood graph exceeds a threshold.

6. The system as recited in claim 1, wherein the search automatically switches from the neighborhood graph to the partitioning tree when a new iteration of the search is triggered.

7. The system as recited in claim 1, wherein an increased closeness of a particular nearest neighbor in the neighborhood graph to the query corresponds to a higher likelihood that the nearest neighbor is more responsive to the query.

8. The system as recited in claim 1, wherein upon receiving a particular one of the one or more pivots, the neighborhood graph component searches for the one or more nearest neighbors within a neighborhood of the pivot.

9. A method implemented by using a processor, comprising:

in response to a query, receiving a first set of pivots from a partitioning tree to serve as starting points for guiding a search in a neighborhood graph;

searching for one or more nearest neighbors within a neighborhood of the first set of pivots that are in closer proximity to the query than the first set of pivots;

triggering a new iteration of the search when the search is unable to identify, from the neighborhood, additional nearest neighbors that are in closer proximity to the query than previously identified nearest neighbors within the neighborhood; and receiving a second set of pivots for guiding the search in the new iteration, in which the partitioning tree is searched for the second set of pivots when the search is unable to identify nearest neighbors that are closer in proximity to the query than previously identified nearest neighbors.

10. The method as recited in claim 9, wherein the triggering causes the search to switch from the neighborhood graph to the partitioning tree.

11. The method as recited in claim 10, wherein the first set of pivots and the second set of pivots are selected based at least in part on a search of the partitioning tree.

12. The method as recited in claim 9, further comprising searching first for nearest neighbors that have a higher probability of constituting a true nearest neighbor associated with the query.

13. The method as recited in claim 9, further comprising:

assembling a priority queue that maintains the one or more nearest neighbors and the first set of pivots; and extracting a particular one of the one or more nearest neighbors from the priority queue and expanding a neighborhood associated with that nearest neighbor.

14. The method as recited in claim 9, further comprising terminating the search when a number of identified nearest neighbors exceeds a threshold or when a true nearest neighbor associated with the query is identified.

15. The method as recited in claim 9, further comprising eliminating nearest neighbors that have a lower probability of being a true nearest neighbor associated with the query.

16. A method implemented by using a processor, comprising:

searching a partitioning tree for one or more pivots associated with a query;

providing a first pivot of the one or more pivots for guiding a search in a neighborhood graph;

searching the partitioning tree for additional pivots when the search in the neighborhood graph is unable to identify nearest neighbors that are closer in proximity to the query than previously identified nearest neighbors; and providing a second pivot for guiding a second iteration of the search in the neighborhood graph.

17. The method as recited in claim 16, wherein the first pivot and the second pivot are selected based at least in part on a relevance or a responsiveness to the query.

18. The method as recited in claim 16, further comprising automatically switching the search from the neighborhood graph to the partitioning tree when the second iteration of the search is triggered.

19. The method as recited in claim 16, wherein the first pivot is used as a starting point for the search of the neighborhood graph.

20. The method as recited in claim 16, wherein the first pivot is utilized to search for nearest neighbors within a neighborhood of the first pivot in the neighborhood graph.

* * * * *